(12) United States Patent
Suzuki

(10) Patent No.: US 10,293,532 B2
(45) Date of Patent: May 21, 2019

(54) METHOD FOR PRODUCING ROLLER MEMBER, ROLLER-MEMBER MOLD, ROLLER SHAFT, AND ROLLER MEMBER

(71) Applicant: CANON KABUSHIKI KAISHA, Tokyo (JP)

(72) Inventor: Osamu Suzuki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/528,482

(22) PCT Filed: Nov. 17, 2015

(86) PCT No.: PCT/JP2015/005711
§ 371 (c)(1),
(2) Date: May 19, 2017

(87) PCT Pub. No.: WO2016/084333
PCT Pub. Date: Jun. 2, 2016

(65) Prior Publication Data
US 2017/0259476 A1    Sep. 14, 2017

(30) Foreign Application Priority Data
Nov. 26, 2014   (JP) ................................. 2014-238457

(51) Int. Cl.
  *B65H 5/06*    (2006.01)
  *B29C 45/14*   (2006.01)
  (Continued)

(52) U.S. Cl.
  CPC ...... *B29C 45/14598* (2013.01); *B29C 45/261* (2013.01); *B41J 13/076* (2013.01);
  (Continued)

(58) Field of Classification Search
  CPC . B65H 5/06; B65H 5/062; B65H 3/06; B65H 3/0638; B65H 2401/111;
  (Continued)

(56) References Cited

U.S. PATENT DOCUMENTS 5,957,261 A * 9/1999 Inoue ................... F16C 13/006
193/37

FOREIGN PATENT DOCUMENTS

JP    62-257820 A      11/1987
JP    01117149 A   *   5/1989
(Continued)

*Primary Examiner* — Luis A Gonzalez
(74) *Attorney, Agent, or Firm* — Canon U.S.A., Inc. I.P. Division

(57) ABSTRACT

A roller shaft is inserted into a mold including molding members respectively having a first mold surface that defines an outer circumference of a roller portion and second and third mold surfaces that respectively define first and second flat portions of the roller portion, and the mold is then closed. A molding material is injected around the roller shaft to integrally mold the roller portion. The roller portion includes the outer circumference and the first and second flat portions rising from the roller shaft to the outer circumference. The roller shaft includes flange portions at portions corresponding to the first and second flat portions. The flange portions prevent the molding material from leaking outside the first and second flat portions when the roller portion is integrally molded around the roller shaft by injection molding.

6 Claims, 17 Drawing Sheets

(51) Int. Cl.
  *B65H 3/06*      (2006.01)
  *B41J 13/076*    (2006.01)
  *B65H 27/00*     (2006.01)
  *B29C 45/26*     (2006.01)
  *B29L 31/32*     (2006.01)

(52) U.S. Cl.
  CPC ............ *B65H 3/0638* (2013.01); *B65H 5/06* (2013.01); *B65H 5/066* (2013.01); *B65H 27/00* (2013.01); *B29C 2045/14131* (2013.01); *B29L 2031/324* (2013.01)

(58) Field of Classification Search
  CPC ............ B65H 2404/11; B65H 2404/10; B65H 2404/113; B65H 27/00; B29C 45/14598; B29C 45/261; B41J 13/076
  See application file for complete search history.

(56) References Cited

FOREIGN PATENT DOCUMENTS

| | | | | |
|---|---|---|---|---|
| JP | 08216296 A | * | 8/1996 | |
| JP | 09124179 A | * | 5/1997 | ............ B65G 39/02 |
| JP | 9-202486 A | | 8/1997 | |
| JP | 9-262835 A | | 10/1997 | |
| JP | 9-323336 A | | 12/1997 | |
| JP | 10-331840 A | | 12/1998 | |
| JP | 2001182739 A | * | 7/2001 | |
| JP | 2002-225092 A | | 8/2002 | |
| JP | 2003160254 A | * | 6/2003 | |

* cited by examiner

[Fig. 1]
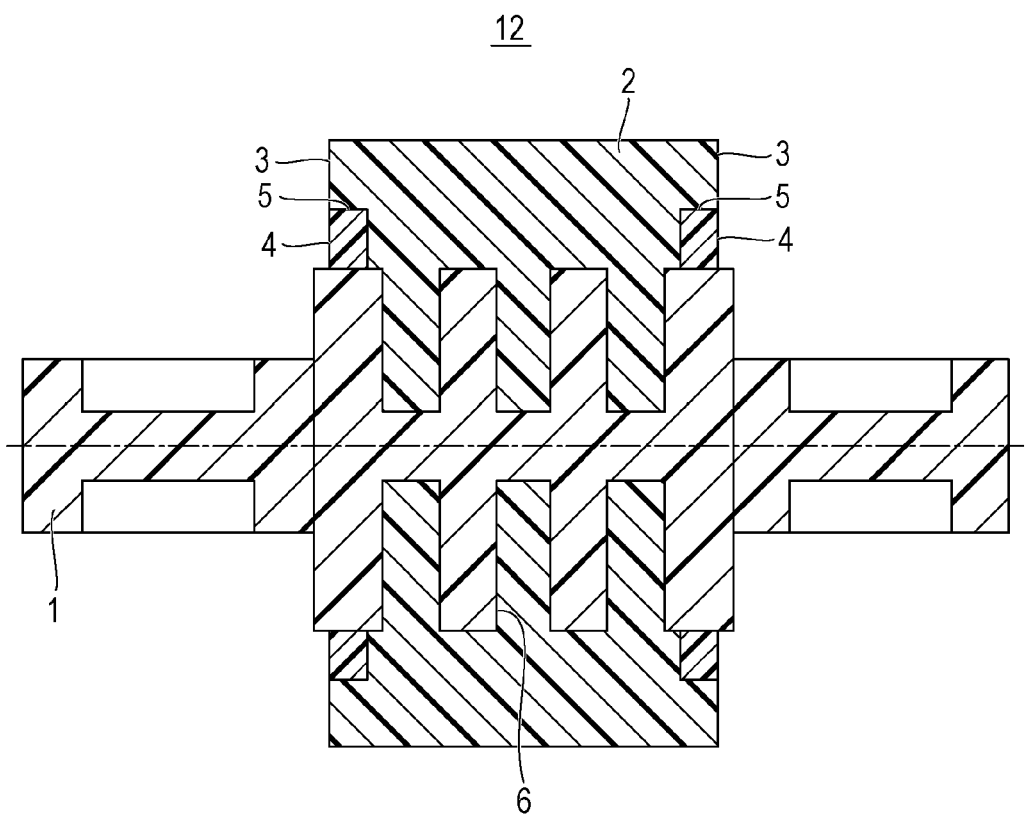

[Fig. 2]
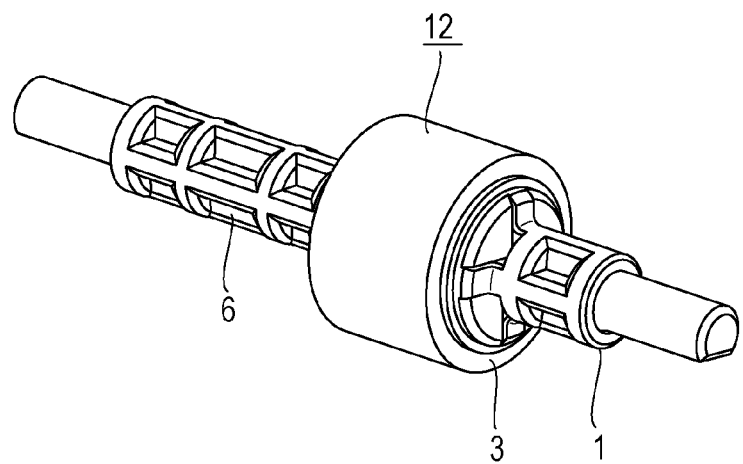

[Fig. 3]
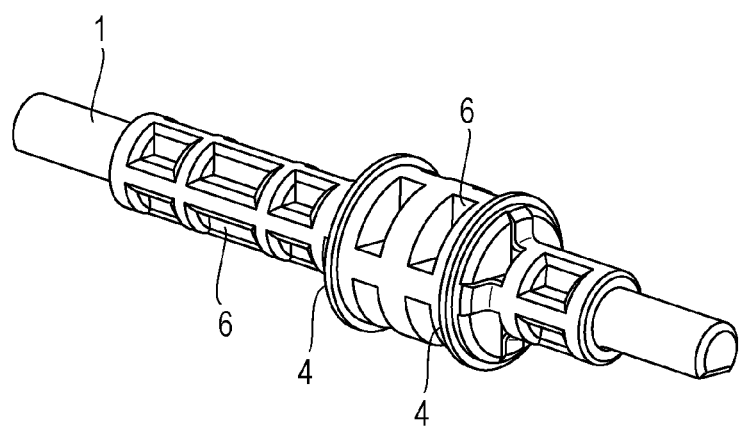

[Fig. 4]
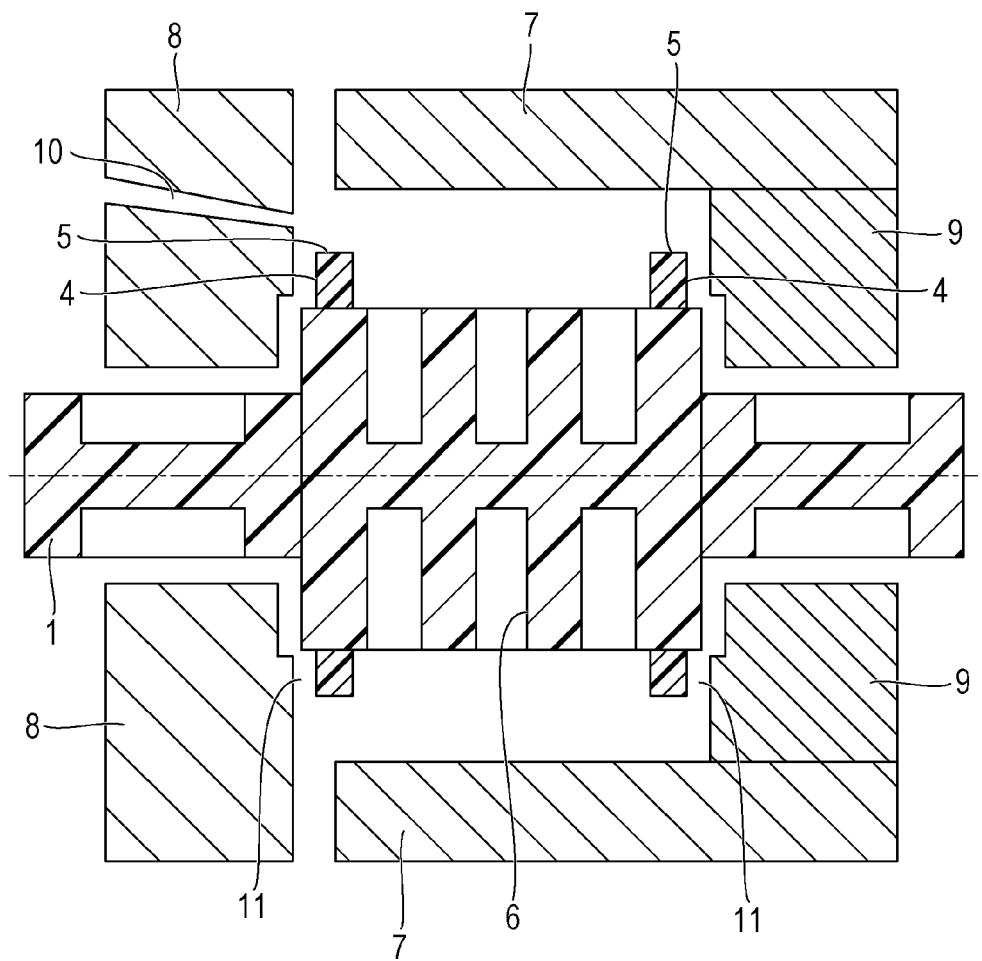

[Fig. 5]
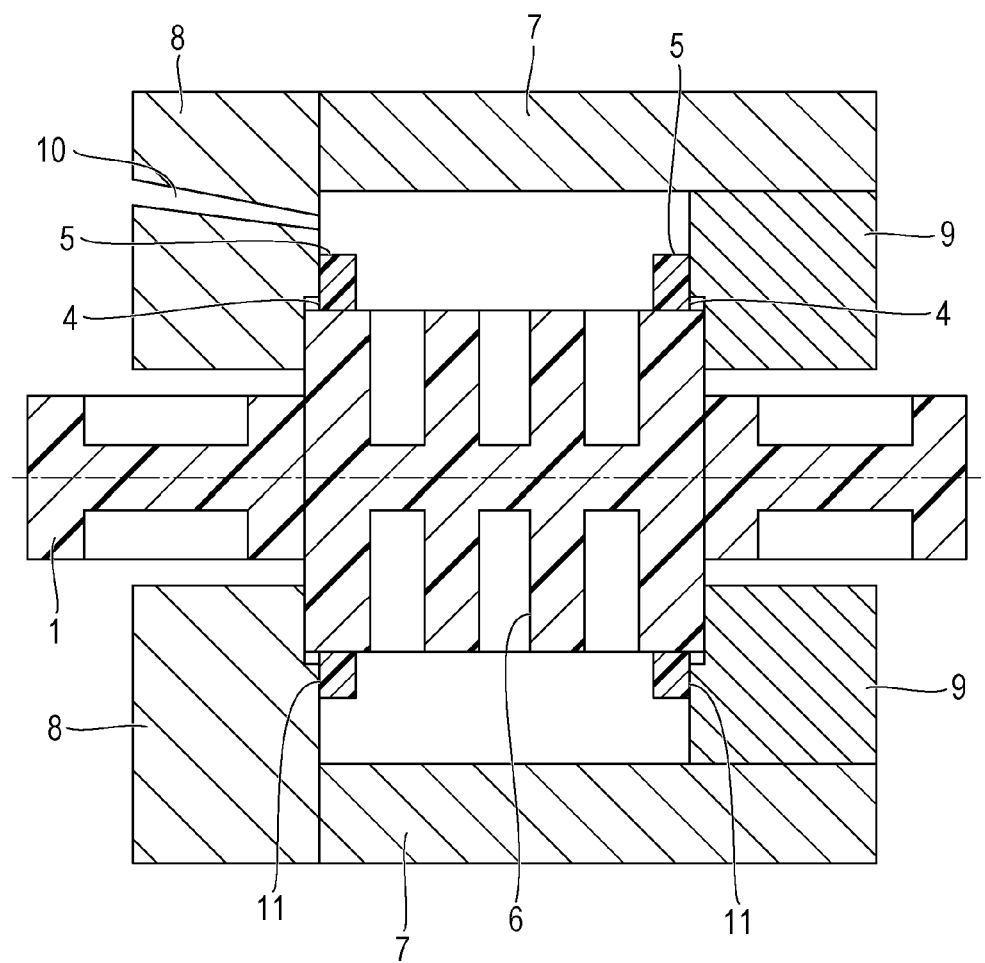

[Fig. 6]
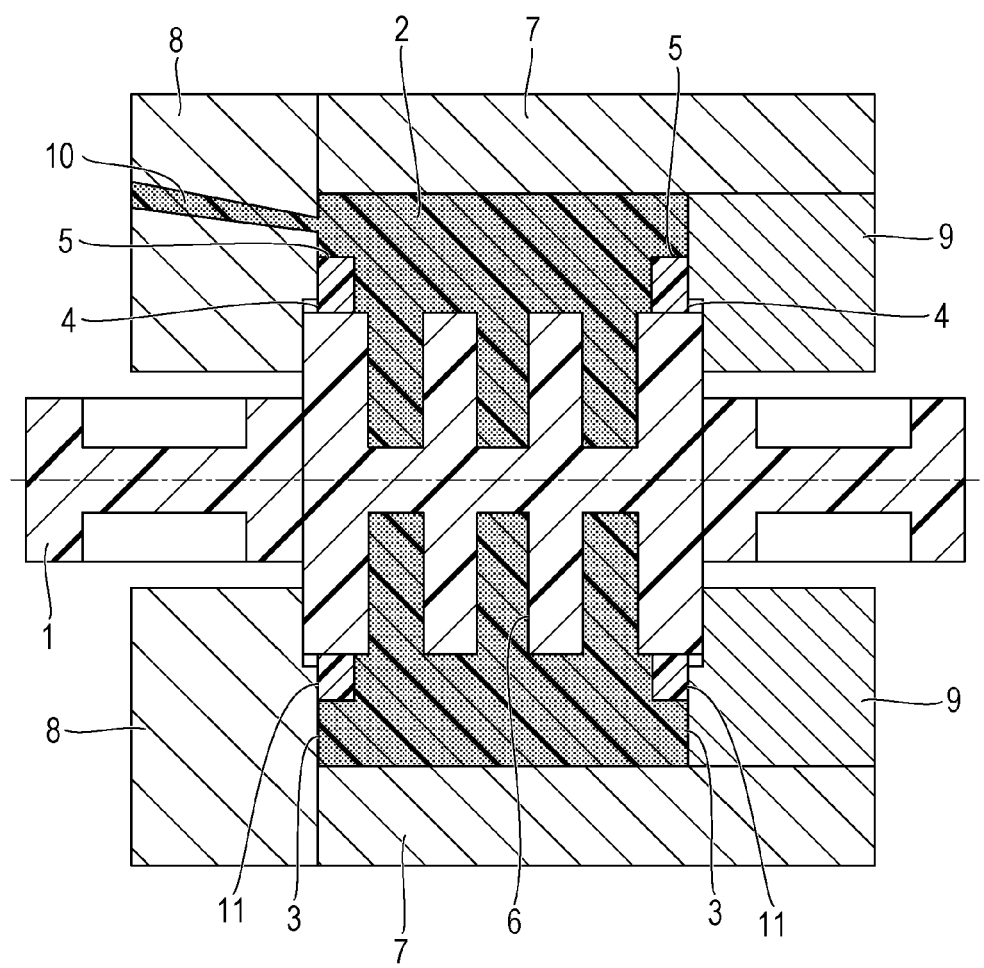

[Fig. 7]
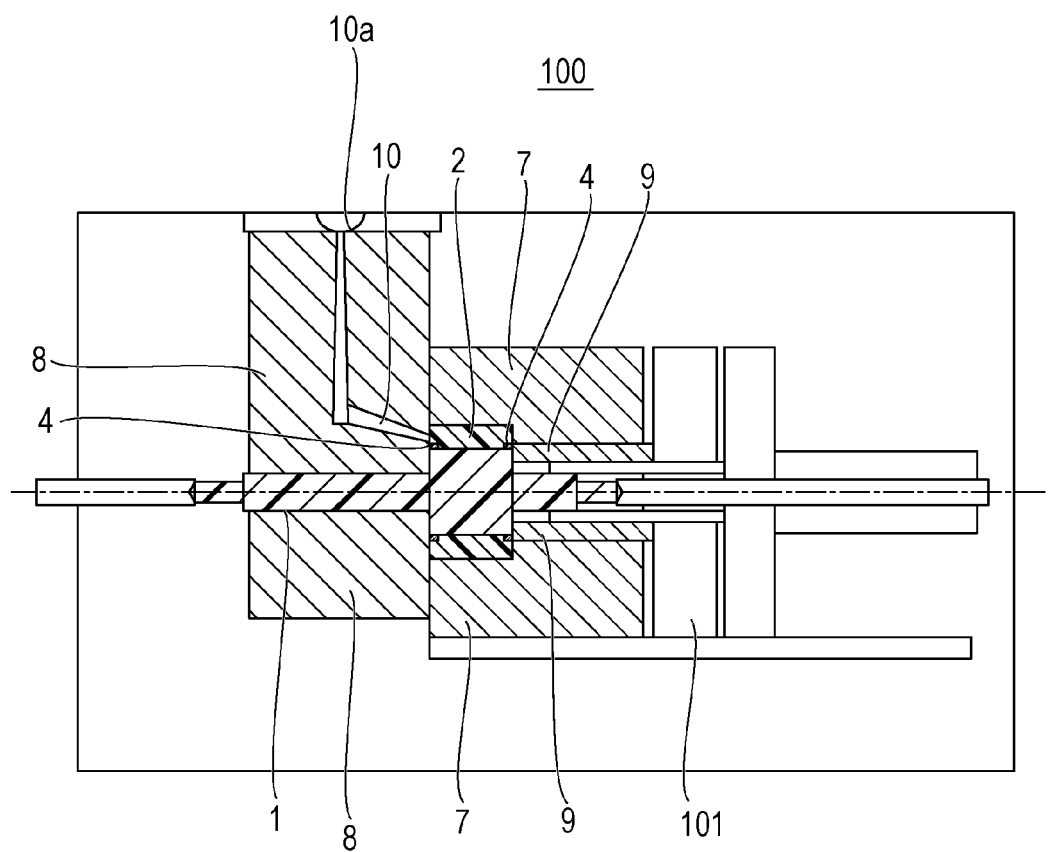

[Fig. 8]
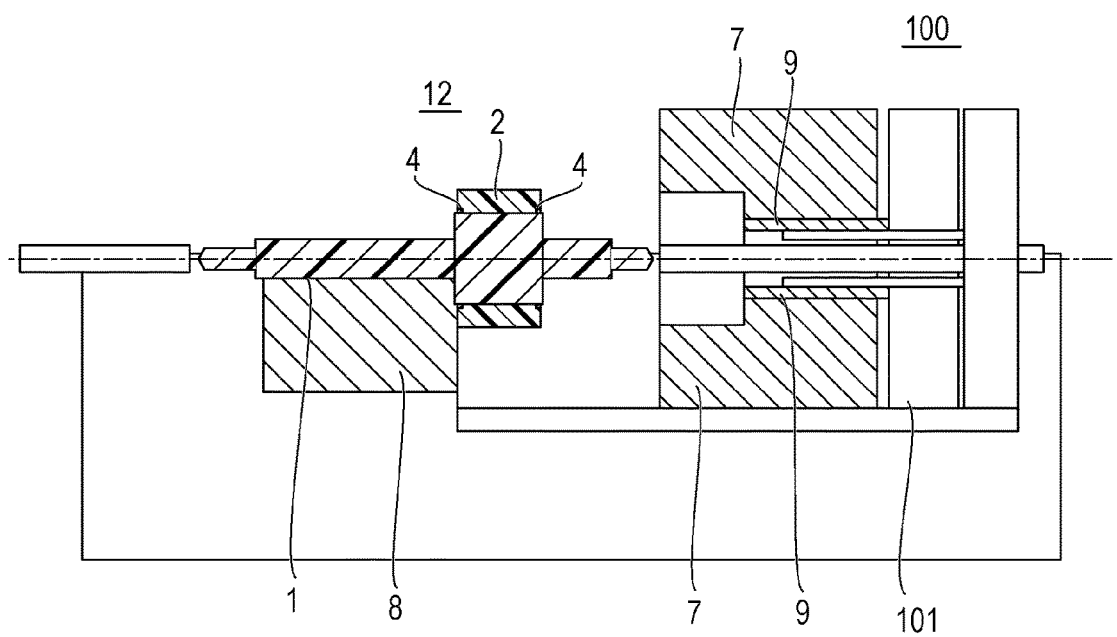

[Fig. 9]
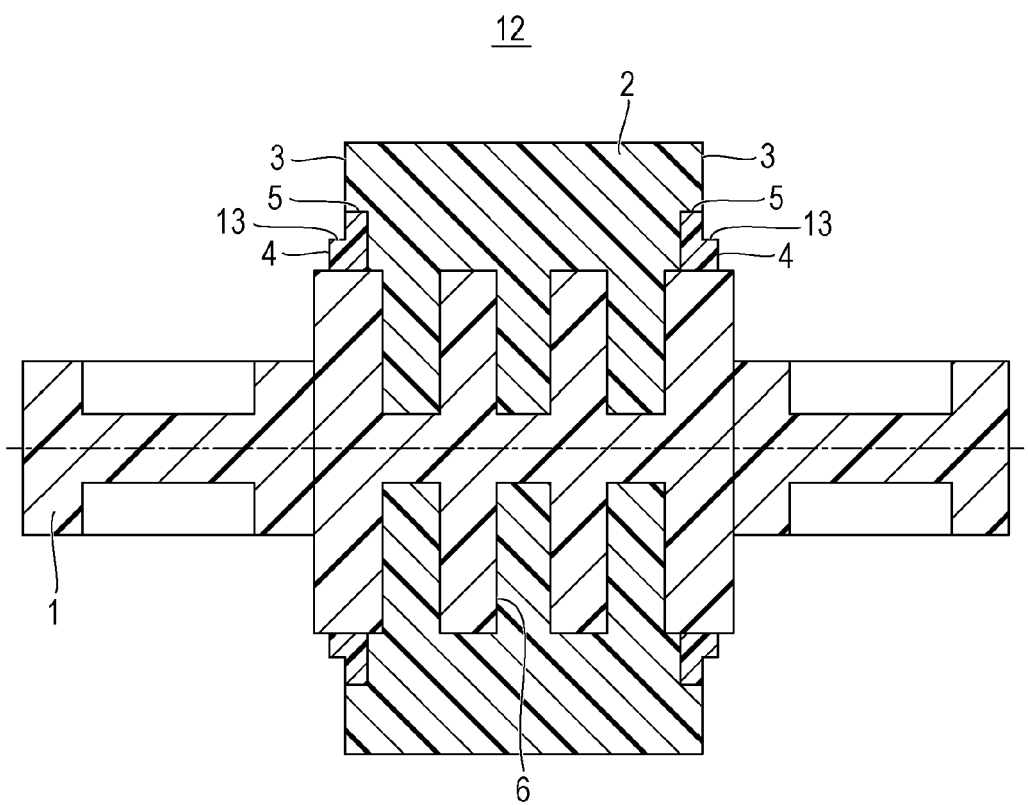

[Fig. 10]
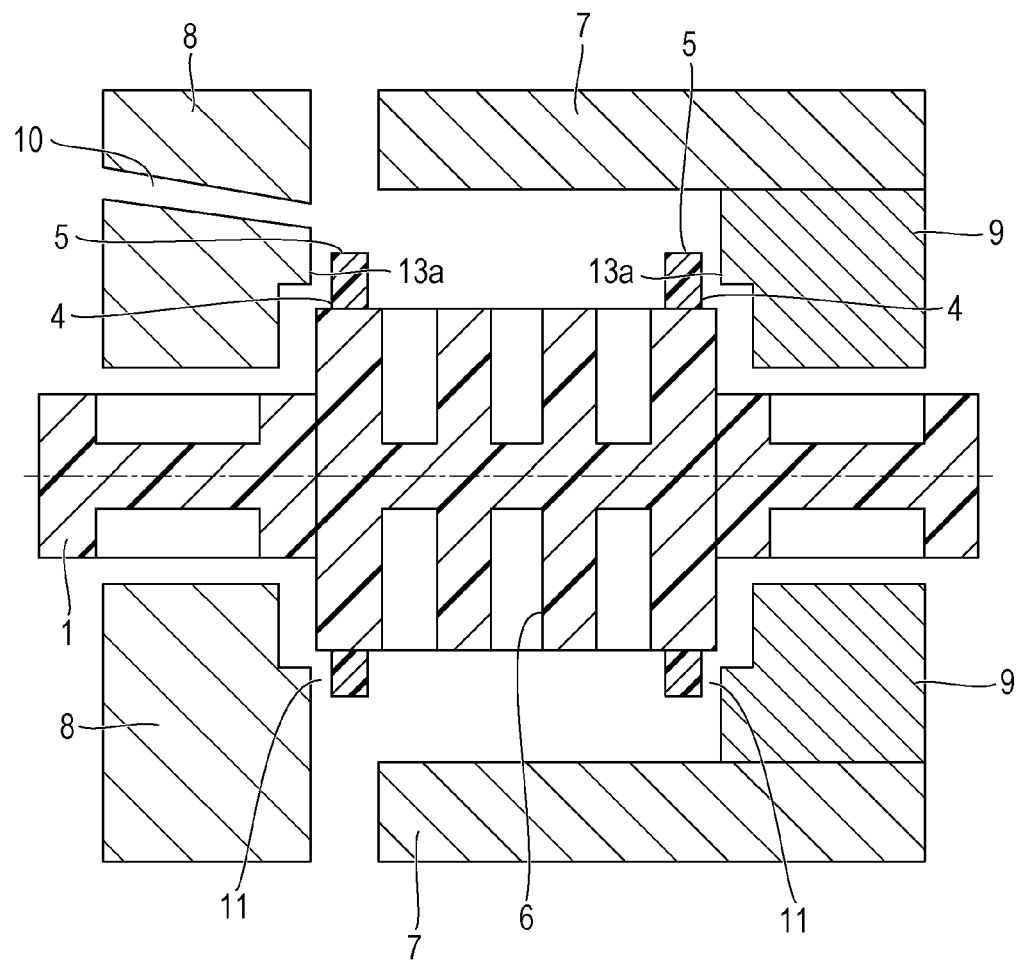

[Fig. 11]
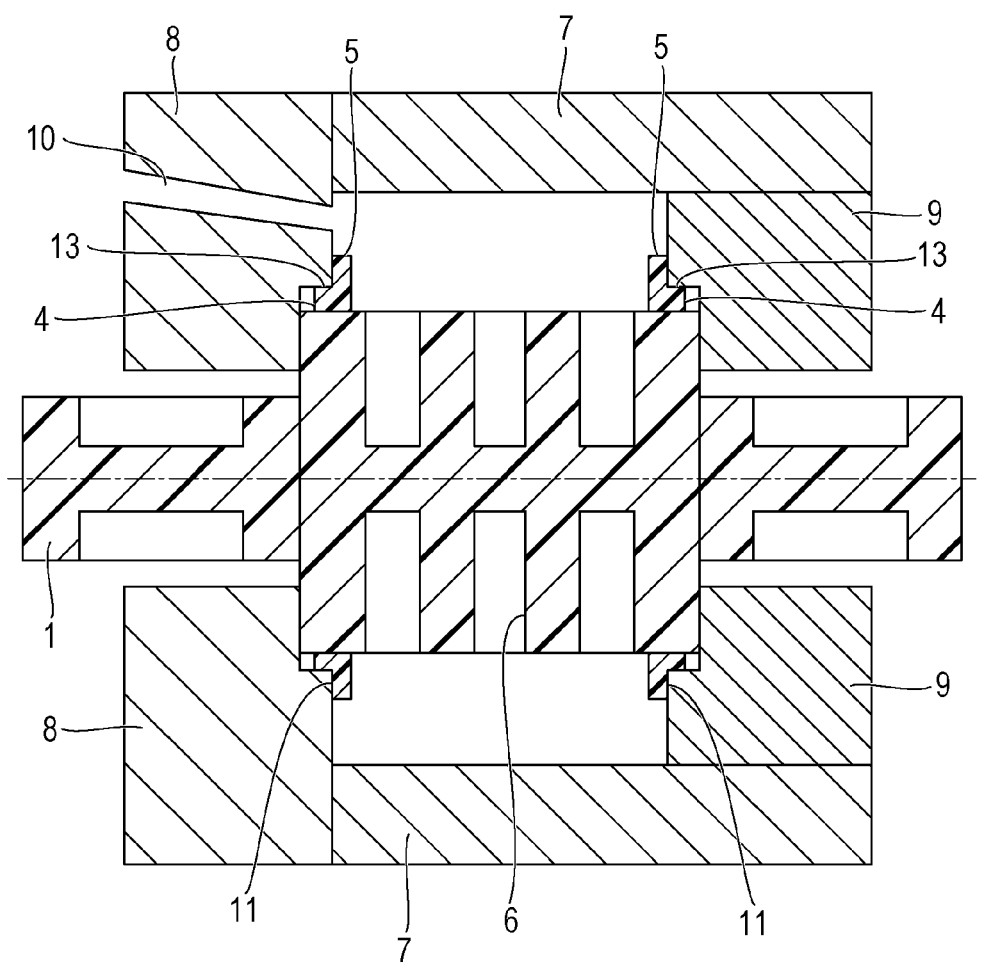

[Fig. 12]
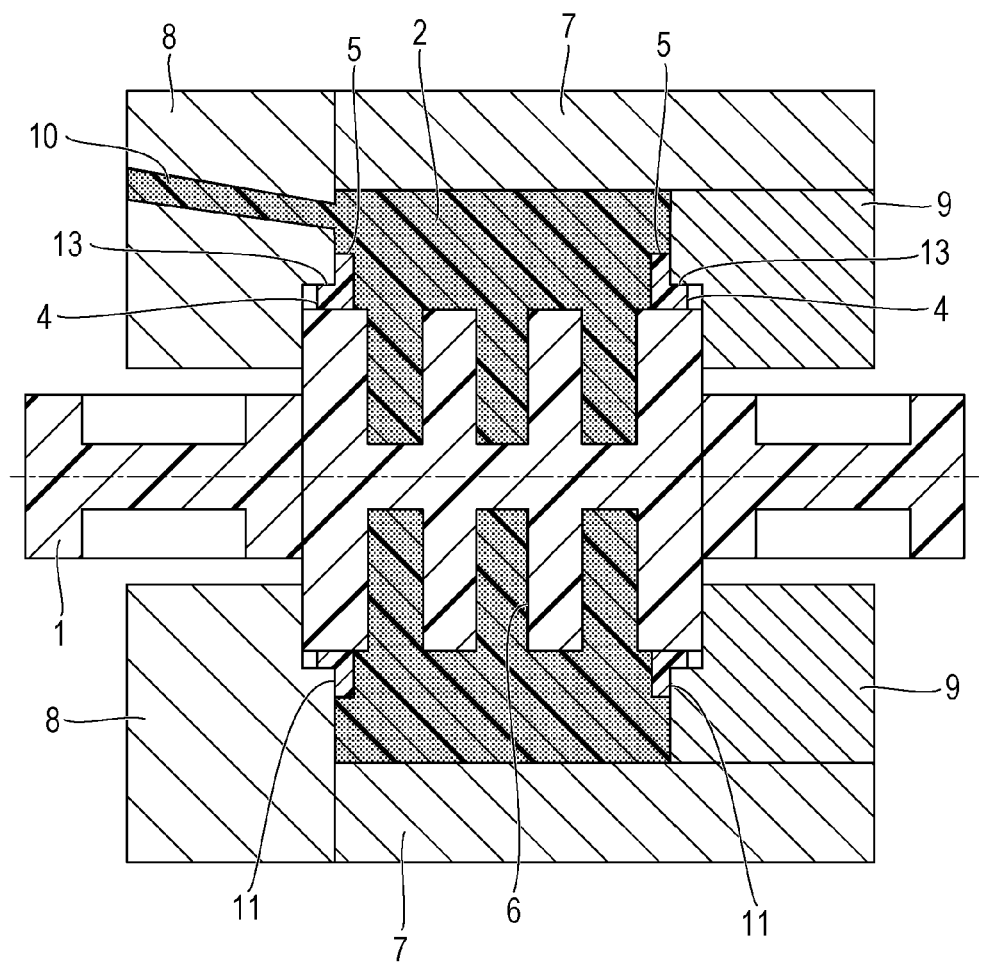

[Fig. 13]
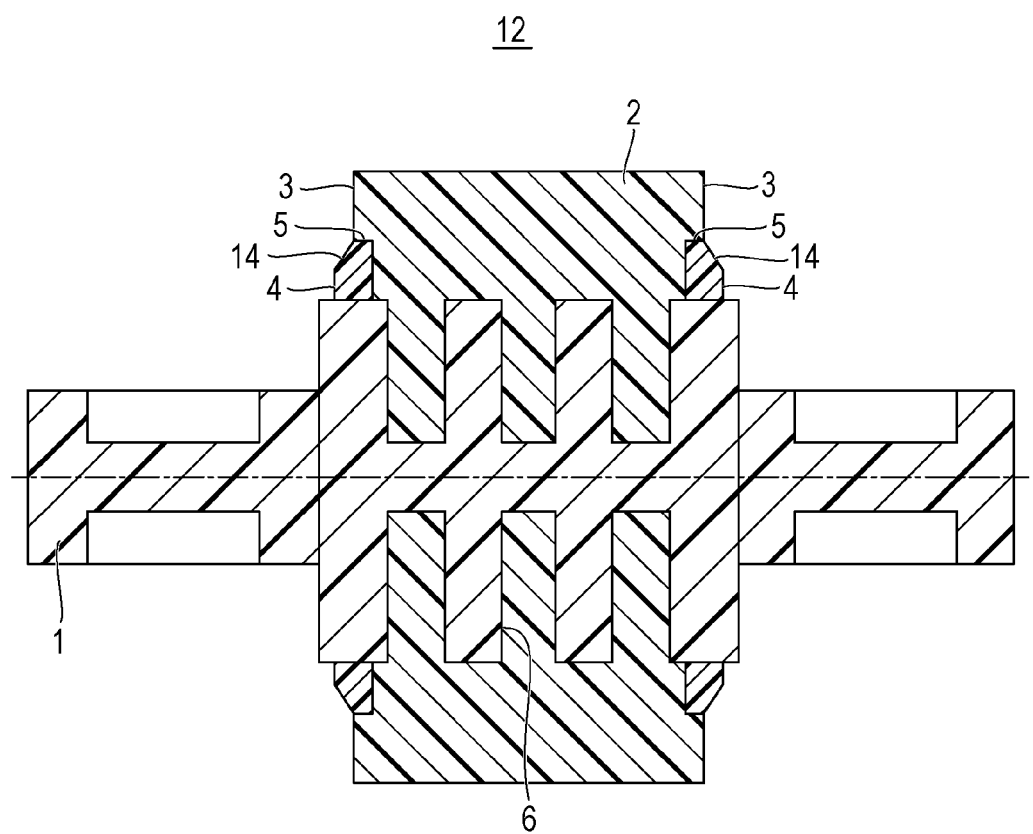

[Fig. 14]
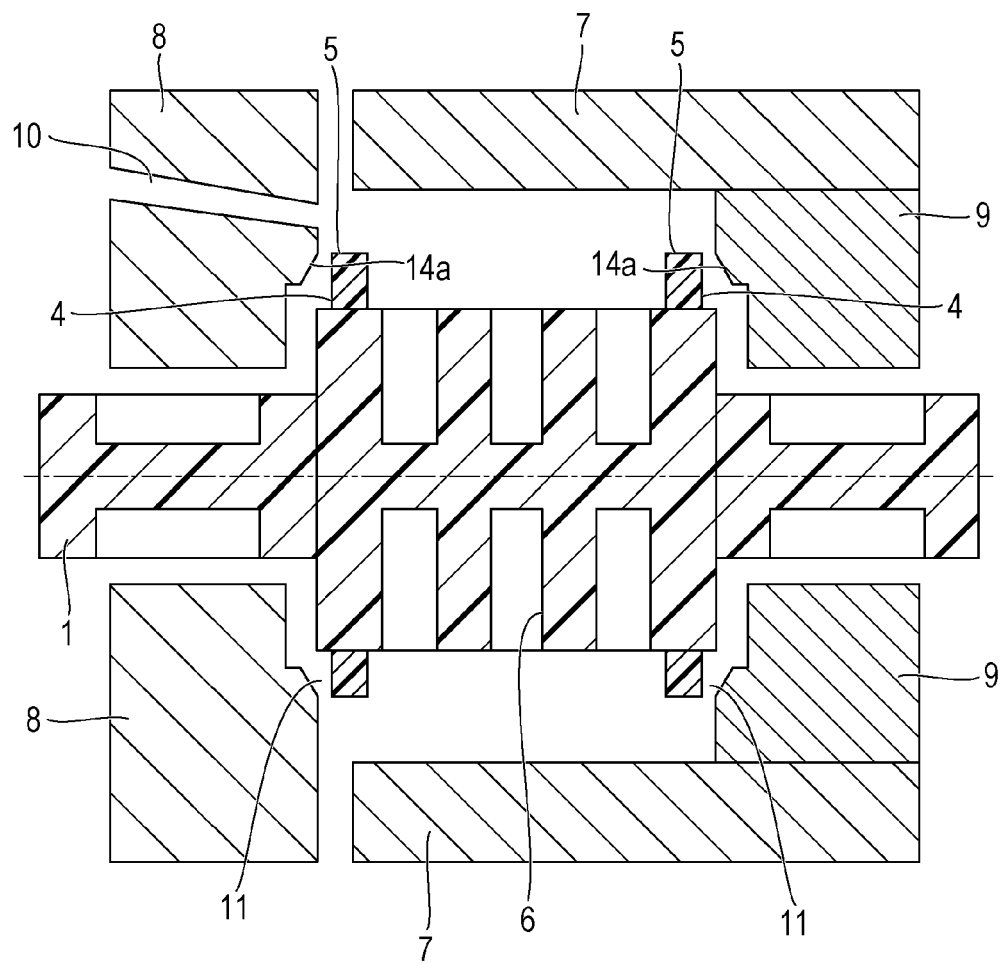

[Fig. 15]
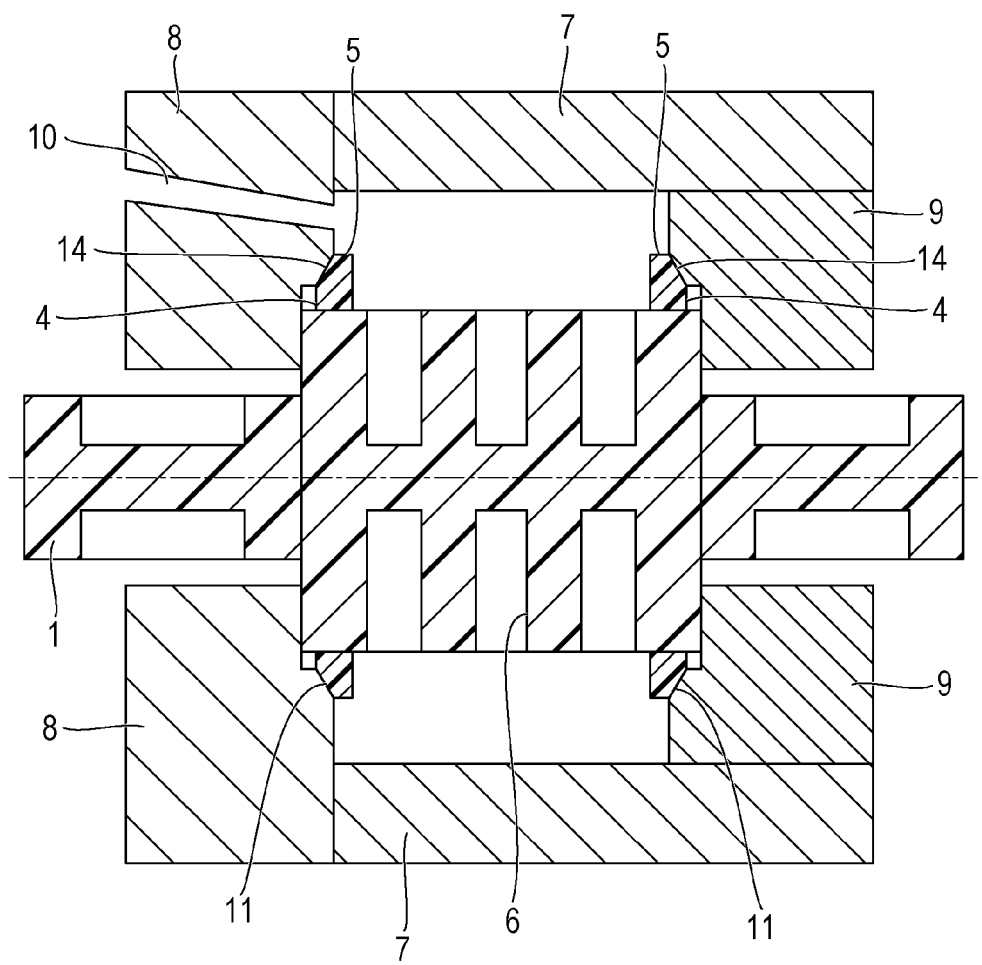

[Fig. 16]
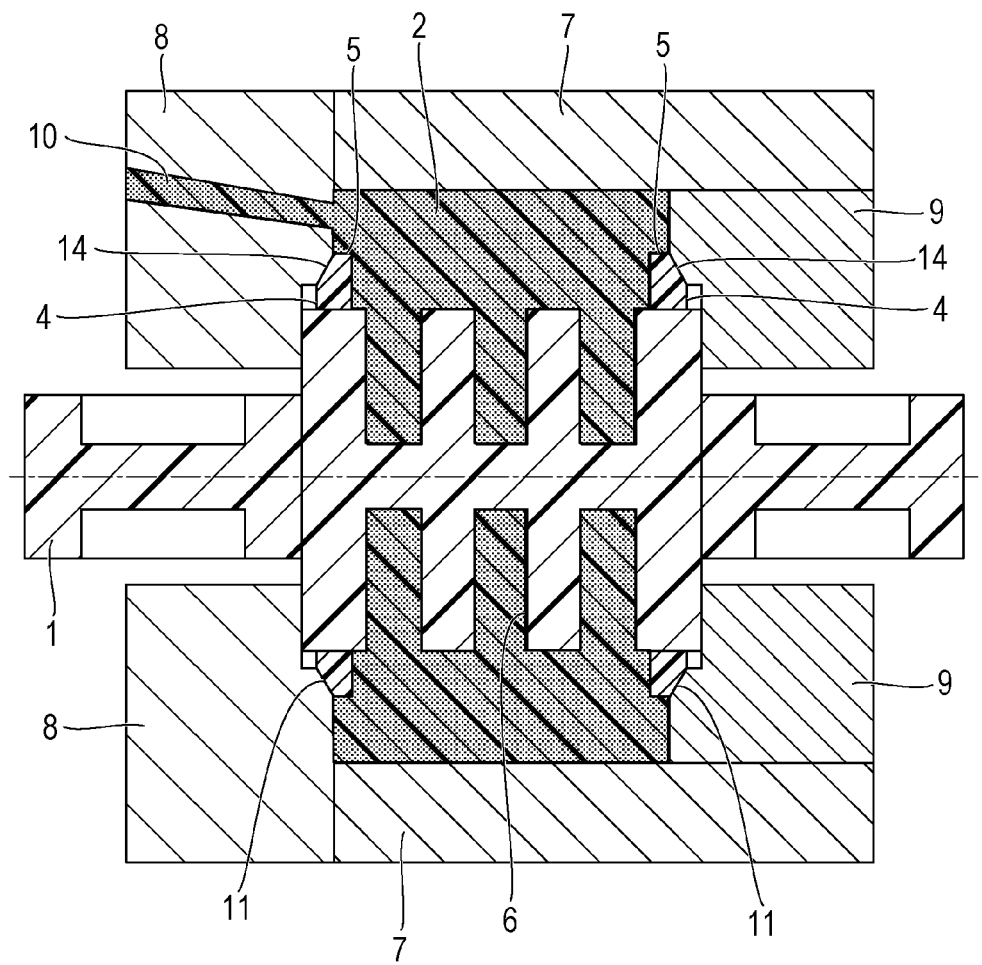

[Fig. 17]
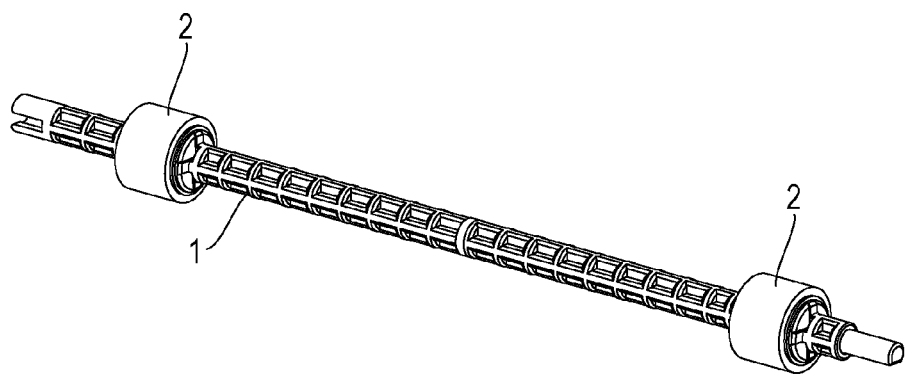

METHOD FOR PRODUCING ROLLER MEMBER, ROLLER-MEMBER MOLD, ROLLER SHAFT, AND ROLLER MEMBER

TECHNICAL FIELD

The present invention relates to a method for producing a roller member by injecting a molding material to the periphery of a roller shaft to integrally mold a roller portion to the roller shaft and relates to a roller-member mold for use in molding the roller member.

BACKGROUND ART

Roller members are used in a conveying system for sheet materials (paper, plastic sheets, and any other sheets) in copying machines and printers. This type of roller members are sometimes produced in the process of press-fitting a roller portion molded with, for example, a synthetic rubber material, into a roller shaft. This method may lead to an increase in production cost because of its large number of processes.

Flange portions, which serve as register marks for positioning a rubber roller portion on a roller shaft in the axial direction when the roller portion is press-fitted in the roller shaft, are disposed at both ends of the roller portion, and the positions of the rubber roller portion is finely adjusted so that the roller portion is positioned inside the two flange portions. However, such a method of production can make clearance between the two flange portions and the rubber roller portion during the press-fitting process, leading to a decrease in the accuracy of the mounting position in the axial direction, or can deform the rubber roller portion, leading to a decrease in the accuracy of the external shape. Thus, to increase the coaxial accuracy of the roller shaft and the rubber roller portion after the press-fitting, the outer circumference needs to be ground, thus increasing the cost. Furthermore, because of the positioning only with press-fitting, the strength of bonding between the roller portion and the roller shaft is so insufficient that the roller portion is displaced.

In view of the above, two-color molding is proposed (for example, PTL 1) for a sheet-conveying roller member of a copying machine or any other machine. The roller member has a friction material around the outer circumference of a roller main body. The friction material and the roller main body are integrally molded by two-color molding. The roller member disclosed in PTL 1 is molded such that the friction material is integrally formed between a plurality of branches disposed substantially at regular intervals around the outer circumference of the roller member. The structure disclosed in PTL 1 in which the friction material and the roller main body are two-color (double) molded eliminates the need for the process of assembling the friction material and the roller main body in a downstream operation.

CITATION LIST

Patent Literature

PTL 1: Japanese Patent Laid-Open No. 9-202486

SUMMARY OF INVENTION

Technical Problem

In the related art disclosed in PTL 1, the roller main body (a roller shaft) and the friction material (a roller portion) around the outer circumference are integrally molded by two-color molding. The technique disclosed in PTL 1 needs to mold the friction material, for example, a thermoplastic elastomer resin, around the outer circumference of the roller main body without clearance, although the configuration of the mold is not shown. However, the roller main body, which is molded with resin (the first molded product), is generally lower in shape accuracy than the mold. This makes it very difficult to bring the entire portion of contact with the mold without clearance. This causes clearance between the roller main body (the roller shaft) and the friction material, causing the resin to flow into the clearance, that is, resin leakage. The resin leakage will cause sink marks in the friction material (the roller portion), leading to a defective product. Even slight leakage of resin will cause burrs. This requires a secondary process, such as deburring work, leading to an increase in cost.

Solution to Problem

The present invention provides a method for easily producing a roller member having a high conveying performance at low cost in which the roller portion has high shape accuracy, high positional accuracy, and high bonding strength and in which the friction material is integrally molded to the roller shaft without leakage of resin.

According to one aspect of the present invention, provided is a method for producing a roller member by inserting a roller shaft into a mold having a first mold surface that defines an outer circumference of a roller portion, a second mold surface that defines a first flat portion rising to the outer circumference of the roller portion, and a third mold surface that defines a second flat portion rising to the outer circumference of the roller portion, by closing the mold, and by injecting a molding material around the roller shaft to integrally mold the roller portion to the roller shaft. The method includes the step of inserting the roller shaft including first and second flange portions at portions respectively corresponding to the first and second flat portions into the mold and closing the mold in such a way that the second and third mold surfaces are respectively brought into close-contact with the first and second flange portions and the step of injecting the molding material for the roller portion into a cavity defined by the first, second, and third mold surfaces of the mold and the roller shaft.

According to another aspect of the invention, provided is a roller member integrally molded by inserting a roller shaft into a mold having a first mold surface that defines an outer circumference of a roller portion, a second mold surface that defines a first flat portion rising to the outer circumference of the roller portion, and a third mold surface that defines a second flat portion rising to the outer circumference of the roller portion, by closing the mold, and by injecting a molding material around the roller shaft. The roller portion includes an outer circumference, a first flat portion rising from the roller shaft to the outer circumference, and a second flat portion rising from the roller shaft to the outer circumference. The roller shaft includes flange portions at portions corresponding to the first and second flat portions, the flange portions preventing the molding material from leaking outside the first and second flat portions when the roller portion is integrally molded around the roller shaft by injection molding.

With the configuration, the molding material for the roller portion is injected into a cavity defined by the first to third mold surfaces and the roller shaft, with the second and third mold surfaces are respectively in close-contact with the first and second flange portions of the roller shaft. This allows for easily producing a roller member having a high conveying performance at low cost in which the roller portion has high shape accuracy, high positional accuracy, and high bonding strength and in which a friction material is integrally molded to the roller shaft without leakage of resin.

Further features of the present invention will become apparent from the following description of exemplary embodiments with reference to the attached drawings.

BRIEF DESCRIPTION OF DRAWINGS

FIG. 1 is a cross-sectional view of a roller member molded according to a first embodiment of the present invention illustrating the structure thereof.

FIG. 2 is a perspective view of the roller member molded according to the first embodiment illustrating the structure thereof.

FIG. 3 is a perspective view of a roller shaft for use in integrally molding the roller member according to the first embodiment, illustrating the structure of the roller shaft.

FIG. 4 is a cross-sectional view of a mold for molding the roller member according to the first embodiment illustrating the roller shaft placed in the mold.

FIG. 5 is a cross-sectional view of the mold for molding the roller member according to the first embodiment illustrating a state in which the mold is closed.

FIG. 6 is a cross-sectional view of the mold according to the first embodiment illustrating a state in which an integral molding material is injected into the mold for molding the roller member.

FIG. 7 is a cross-sectional view of the mold for molding the roller member according to the first embodiment and a molding apparatus, illustrating in outline the configuration in a closed state.

FIG. 8 is a cross-sectional view of the mold for molding the roller member according to the first embodiment and the molding apparatus illustrating in outline the configuration in am opened state.

FIG. 9 is a cross-sectional view of a roller member molded according to a second embodiment of the present invention illustrating the structure thereof.

FIG. 10 is a cross-sectional view of a mold for molding the roller member according to the second embodiment illustrating a state in which the roller shaft is placed in the mold.

FIG. 11 is a cross-sectional view of the mold for molding the roller member in FIG. 10 illustrating a state in which the mold is closed.

FIG. 12 is a cross-sectional view of the mold in FIG. 10 illustrating a state in which an integral molding material is injected into the mold.

FIG. 13 is a cross-sectional view of a roller member molded according to a third embodiment of the present invention illustrating the structure thereof.

FIG. 14 is a cross-sectional view of a mold for molding the roller member according to the third embodiment illustrating a state in which the roller shaft is placed in the mold.

FIG. 15 is a cross-sectional view of the mold for molding the roller member in FIG. 14 illustrating a state in which the mold is closed.

FIG. 16 is a cross-sectional view of the mold in FIG. 14 illustrating a state in which an integral molding material is injected into the mold.

FIG. 17 is a perspective view of a configuration example of a roller member for use in, for example, conveying sheet materials.

DESCRIPTION OF EMBODIMENTS

Roller members, roller-member molds, roller shafts, and a method for producing the roller members according to embodiments of the present invention will now be described with reference to the accompanying drawings. It is to be understood that the following embodiments are mere examples; for example, the configuration of the details can be changed by those skilled in the art as appropriate without departing from the spirit of the present invention. The numerical values in the embodiments are mere reference values and are not intended to limit the present invention.

First Embodiment

In a first embodiment, a roller-member mold for producing a roller member and a roller shaft 1, shown in FIG. 17, and a method for integrally molding a roller member will be described using a roller member in which roller portions 2 are integrally molded on the roller shaft 1. In FIG. 17, the roller portions 2 are molded on two positions of the roller shaft 1. Such a roller member can be used to convey sheet materials (for example, paper and plastic sheets) in copying machines or printers. In this specification, integral molding refers to injecting resin into a mold in which a member is placed to bond the member and the injected resin together.

FIG. 1 illustrates a cross-section structure of a roller member 12 of this embodiment in which the roller portion 2 is integrally molded on the roller shaft 1. FIG. 2 is a perspective view of the whole of the roller member 12 in FIG. 1. FIG. 3 is a perspective view of the roller shaft 1 for use in integrally molding the roller member 12 in the embodiment, illustrating the structure of the roller shaft 1. In FIG. 1, the one-dot chain line indicates the center (of rotation) of the roller shaft 1 (this also applies to the other cross-sectional views).

The roller shaft 1 and the roller portion 2 in FIGS. 1 to 3 are individually made of molding materials, described later. The roller portion 2 is integrally molded around the outer circumference of the roller shaft 1 with a molding material capable of forming a frictional surface. The outer circumference of the roller portion 2 has a frictional surface for conveying sheet materials or any other materials. Both ends of the roller portion 2 are flat portions 3 and 3 (a first flat portion and a second flat portion) rising to the outer circumference of the roller portion 2.

The roller shaft 1 of this embodiment includes flange portions 4 and 4 (first and second flange portions) at positions corresponding to the flat portions 3 and 3 of the roller portion 2. The flange portions 4 and 4 are integrally molded when the roller shaft 1 is molded, with a predetermined thickness and a diameter larger than the outside diameter of the roller shaft 1, around the whole circumference of the roller shaft 1. The flange portions 4 and 4 have bite portions 5 and 5 that bite into the roller portion 2 of the integrally molded roller member 12, as shown in FIG. 1.

The flange portions 4 and 4, if having a larger diameter in the range from 0.2 mm or more to 3 mm or less than the outside diameter of the roller shaft 1, have the advantageous effect of the present invention, although their appropriate range differs according to the shape and dimensions of the roller shaft 1. Furthermore, the flange portions 4 and 4, if having a thickness of 0.1 mm or more and 3 mm or less, have the advantageous effect of the present invention, although their appropriate range differs according to the shape and dimensions of the roller shaft 1.

The roller shaft 1 has cut portions 6 to decrease the thickness of, particularly, part of the roller shaft 1 under the roller portion 2 (a base or seat) (FIGS. 1 and 3). The cut portions 6 can be formed when the roller shaft 1 is molded. The cut portions 6 can also be formed in part of the roller shaft 1 except the roller portion 2 (FIGS. 2, 3, and 17). Remaining part after the cut portions 6 are formed has a rib structure as illustrated. The cut portions 6 under the roller portion 2 are filled with the same molding material as the molding material of the roller portion 2 in connection to the roller portion 2. This allows the roller portion 2 and the roller shaft 1 to be tightly bonded, preventing the roller portion 2 from sliding on the roller shaft 1.

The flange portions 4 and 4 of the roller shaft 1 of this embodiment bite into the roller portion 2 to form a single unit, as shown in FIG. 1. This forms no clearance, leading to high positional accuracy in the axial direction. Furthermore, the roller member 12 is integrally molded without clearance, and the radial size is determined according to the mold. This leads to high dimensional accuracy in the radial direction, thus eliminating the need for an abrasive operation or the like in downstream processing.

Furthermore, when the roller member 12 with the configuration as shown in FIGS. 1 and 2 is used as a common roller member for conveying sheet materials or the like, a contact pressure acts on the roller portion 2 so that the entire roller portion 2 is compressed in the radial direction. This contact pressure is generated by an urging means, such as a spring, disposed in a copying machine or a printer. In contrast, the roller member 12 of this embodiment has a feature in that the thickness of the roller portion 2 in the radial direction at the bite portions 5 and 5 of the flange portions 4 and 4 is smaller than the thickness of the other part of the roller portion 2 by an amount corresponding to the height of the flange portions 4 and 4 in the radial direction, as shown in FIG. 1. This configuration allows the part of the roller portion 2 on the flange portions 4 and 4 (the bite portions 5 and 5) to have a higher repulsive force against the contact pressure than the repulsive force of the other part. Thus, the roller member 12 of this embodiment has a stronger grip necessary for conveyance than a known structure without the flange portions 4 and 4, thus providing a higher conveying performance.

The bite portions 5 and 5, if having a thickness of 0.01 mm or more and 3 mm or less, have the advantageous effect of the present invention, although an appropriate range differs according to the shape and dimensions of the roller shaft 1.

Referring next to FIGS. 4 to 8, a roller-member mold for producing the roller member 12 shown in FIGS. 1 and 2 and a method for producing the roller member 12 will be described. FIG. 4 is a cross-sectional view of a mold for molding the roller member 12 of this embodiment. FIG. 4 illustrates the mold opened and the roller shaft 1 placed in the mold. The roller shaft 1 is separately injection-molded using another mold into the shape as shown in FIG. 3 in which the cut portions 6 and the flange portions 4 and 4 at the position corresponding to the base of the roller portion 2 are provided.

In FIG. 4, a first molding member 7 has a first mold surface that defines the outer circumference of the roller portion 2; a second molding member 8 has a second mold surface that defines one of the flat portions 3 (the first flat portion) of the roller portion 2; and a third molding member 9 has a third mold surface that defines the other flat portion 3 (the second flat portion) of the roller portion 2.

In this embodiment, a molding-material injection port 10 is disposed in the second molding member 8. In the state shown in FIG. 4 in which the mold is not closed, there is clearance at a boundary 11 between the flange portion 4 and the second molding member 8 and a boundary 11 between the flange portion 4 and the third molding member 9.

Any of the first to third molding members 7 to 9 can be divided into a plurality of pieces (for example, two pieces, about the center of the mold) as needed, for example, for the convenience of opening the mold or extracting the roller member 12. FIGS. 7 and 8 illustrate an example of the divided structure of the molding members 7 to 9.

However, the above mold-divided structure of the first molding member 7, the second molding member 8, or the third molding member 9 is given for mere illustration; the mold-divided structure can be changed by those skilled in the art provided that the structure allows for injection molding of the roller portion 2. In any mold-divided structure, this embodiment essentially needs at least the following three mold surfaces (the last parenthetic phrases indicate the relationship with the first to third molding members 7 to 9 of this embodiment):

(1) A first mold surface that defines the outer circumference of the roller portion 2 (the first molding member 7)

(2) A second mold surface that defines the first flat portion 3 that rises to the outer circumference of the roller portion 2 (the second molding member 8)

(3) A third mold surface that defines the second flat portion 3 that rises to the outer circumference of the roller portion 2 (the third molding member 9)

The integral molding of the roller portion 2 of this embodiment corresponds to a production method of inserting the roller shaft 1 into the mold that defines the above first to third mold surfaces, closing the mold, and injecting a molding material to the circumference of the roller shaft 1 to integrally mold the roller portion 2 to the roller shaft 1.

FIG. 5 is a cross-sectional view of the mold in FIG. 4 illustrating a state in which the mold is closed, in which the molding material has not yet injected. The state in FIG. 5 corresponds to a state in which the process of inserting the roller shaft 1 is completed.

The roller shaft 1 placed in the mold has the first and second flange portions 4 and 4 at portions corresponding to the first and second flat portions 3 and 3. The cavity defined by the first molding member 7, the second molding member 8, and the third molding member 9 (or the roller shaft 1) is shaped so that when the roller shaft 1 is inserted and the mold is closed, the roller shaft 1 and the mold surfaces come to the following contact state.

The contact state is a state in which the roller shaft 1 is placed in the mold in such a manner that the second mold surface (the second molding member 8) and the third mold surface (the third molding member 9) are in close-contact with the first and second flange portions 4 and 4 of the roller shaft 1.

Furthermore, the following contact state may be achieved. That is, not only the second mold surface (the second molding member 8) and the third mold surface (third molding member 9) are in contact with the first and second flange portions 4 and 4 but also the first and second flange portions 4 and 4 are pushed so that the first and second flange portions 4 and 4 are elastically (or plastically) deformed inward.

The above contact state when the roller shaft 1 is inserted into the mold and then the mold is closed can be achieved by the shape of the cavity defined by the mold, in particular, the second molding member 8 and third molding member 9, and by setting the dimensions of the roller shaft 1, in particular, the first and second flange portions 4 and 4.

Achieving the above contact state during the insertion and closing of the mold allows the second mold surface (the second molding member 8) and the third mold surface (the third molding member 9) to be respectively brought into close-contact with the first and second flange portions 4 and 4. The close contact can completely eliminate clearance at the boundaries 11 between the roller portion 2 and the roller shaft 1.

The boundaries 11 between the roller portion 2 and the roller shaft 1, which correspond to the bases of the flat portions 3 and 3 of the roller portion 2, can be channels through which the molding material flows to, for example, portions on the roller shaft 1 other than the roller portion 2. However, this embodiment is configured to respectively bring the first and second flange portions 4 and 4 of the roller shaft 1 into close-contact with the second mold surface (the second molding member 8) and the first third mold surface (the third molding member 9). This configuration effectively prevents the molding material from leaking to portions on the roller shaft 1 other than the roller portion 2 during injection of the molding material, described later.

FIG. 6 illustrates a state in which the molding material of the roller portion 2 is injected through the injection port 10 after the insertion and mold closing in FIG. 5 in cross section. FIG. 6 illustrates the molding material for the roller portion 2 with a shaded pattern. The molding material is injected through the injection port 10 into a cavity defined by the first to third molding members 7 to 9 to fill the cut portions 6 of the roller portion 2 and the roller shaft 1, as shown in FIG. 6.

In this embodiment, the shape of the cavity in the mold and the dimensions of the portions of the roller shaft 1 are set so that the second mold surface (the second molding member 8) and the third mold surface (the third molding member 9) are respectively brought into close-contact with the first and second flange portions 4 and 4, as described above. Furthermore, a contact state is achieved in which the second and third mold surfaces (the second and third molding members 8 and 9) respectively press the first and second flange portions 4 and 4 so that part of the first and second flange portions 4 and 4 is elastically (or plastically) deformed inward. This allows the clearance at the boundaries 11 between the roller portion 2 and the roller shaft 1 to be completely sealed. This prevents the injected molding material from leaking through the boundaries 11 and remaining as burrs, thus allowing the high-quality roller member 12 to be provided only by integral (injection) molding without the need for post processing.

FIGS. 7 and 8 are cross-sectional views of a molding apparatus 100 according to an embodiment for integrally (injection) molding the roller portion 2 on the roller shaft 1 using the roller-member mold shown in FIGS. 4 to 6.

The configuration illustrated in FIGS. 7 and 8 slightly differs from the configuration in FIGS. 4 to 6 in that the injection port 10 of the second molding member 8 is substantially L-shaped so that the molding material can be injected through a bush 10a on the top and in the dimensions of the molding members 7 to 9.

With the configuration in FIGS. 7 and 8, the first molding member 7 and the third molding member 9 are ring-shaped, as illustrated in FIG. 8, and can be laterally slid together by a moving stage 101 of the molding apparatus 100. For example, the ring shape of the first molding member 7 and the third molding member 9 allows the outer circumferential surface of the roller portion 2 to be integrally seamlessly molded. The second molding member 8 in FIG. 7 can be divided into, for example, upper and lower pieces. The upper half including the injection port 10 can be removed when the mold is opened, as shown in FIG. 8.

However, the mold and the first to third molding members 7 to 9 in FIGS. 7 and 8 have the same function as the function of the mold and the first to third molding members 7 to 9 in FIGS. 4 to 6 in terms of the production process for integrally molding the roller portion 2 on the roller shaft 1.

FIG. 7 illustrates a state in which the first to third molding members 7 to 9 are opened, in which the roller shaft 1 is placed, and then the first to third molding members 7 to 9 are closed, in which the molding material is injected through the injection port 10.

FIG. 8 illustrates a state in which the mold is thereafter opened. In FIG. 8, the first molding member 7 and the third molding member 9 have been moved along the axis of the roller shaft 1 to the right in the drawing by the moving stage 101 of the molding apparatus 100. Of the upper and lower halves of the second molding member 8, the upper half including the injection port 10 has been removed. The mold open state as in FIG. 8 allows the roller member 12 in which the roller portion 2 is integrally molded on a predetermined portion of the roller shaft 1 to be extracted upward from the molding apparatus 100. The extracting operation may be performed manually by an operator or with a robot hand or any other device.

The configuration of the mold and the molding apparatus 100 illustrated in FIGS. 7 and 8 allows the first molding member 7 and the third molding member 9 to be slid to any position along the axis of the roller shaft 1 by the moving stage 101. Thus, controlling the amount of sliding using the moving stage 101 allows for freely setting the amounts of pressure of the second molding member 8 and the third molding member 9 against the flange portions 4 and 4 (the bite portions 5 and 5). The above configuration allows, for example, leakage or burrs around the roller portion 2, to be coped with by adjusting the positions of the first molding member 7 and the third molding member 9, with the mold closed, using the moving stage 101.

As described above, this embodiment allows production of the roller member 12 in which the roller portion 2 is integrally molded on the roller shaft 1 without the need for a conventional roller portion press-fitting process or the like. This eliminates the influence of dimensional errors and operating accuracy, as in the method of press-fitting a roller portion in a downstream operation, and prevents undesired force from being applied to the outer circumference of the roller portion 2, allowing the dimensions and position of the roller portion 2 to be kept at high accuracy. The embodiment allows the roller shaft 1 and the roller portion 2 to be firmly bonded, preventing slipping and deformation of the roller portion 2, thus allowing objects, such as sheet materials, to be conveyed at high accuracy.

The roller shaft 1 of this embodiment has the first and second flange portions 4 and 4 at portions respectively corresponding to the first and second flat portions 3 and 3 of the roller portion 2. When the roller shaft 1 is inserted into the mold, and the molded is closed, the second and third mold surfaces (the molding members 8 and 9) are respectively brought into contact with the first and second flange portions 4 and 4, or the second and third mold surfaces are pushed so that part of the flange portions 4 and 4 are half deformed. This contact or pushed state of the first and second flange portions 4 and 4 with the second and third mold surfaces (the molding members 8 and 9) are achieved by the shapes and dimensions of the second and third molding members 8 and 9 or by controlling the positions of the molding members 8 and 9 of the molding apparatus 100. In particular, the contact or pushed state can be finely adjusted by the molding apparatus 100, as described using FIGS. 7 and 8.

An amount of pressure (deformation amount) of 0.01 mm or more and 3 mm or less allows the advantageous effect of the present invention to be given, although an appropriate range differs according to the shapes and dimensions of the molding members 8 and 9.

As described above, a molding material is injected into the cavity of the mold, with the first and second flange portions 4 and 4 and the second and third mold surfaces (the molding members 8 and 9) in contact or pressed, to integrally mold the roller portion 2 to the roller shaft 1. In this embodiment, this allows the clearance at the boundaries 11 between the roller portion 2 and the roller shaft 1 to be completely sealed during injection. This prevents the injected molding material from leaking to an undesired portion on the roller shaft 1 through the boundaries 11 or remaining as burrs, thus allowing production of the high-quality roller member 12 without leaked resin and burrs only by integral molding without the need for post processing.

Furthermore, according to this embodiment, the roller member 12 is produced, with part of the flange portions 4 and 4 of the roller shaft 1 bitten in the flat portions 3 and 3 of the roller portion 2. This decreases the radial thickness of the roller portion 2 at the flat portions 3 and 3 by an amount corresponding to the flange portions 4 and 4, providing a strong repulsive force against compression. Thus, for application to conveyance of sheet materials in which the roller member 12 is brought into pressure-contact with the object by an urging member, a large gripping force is produced in the vicinity of the flat portions 3 and 3 at both ends of the roller portion 2. This eliminates or reduces conveying failure.

The flange portions 4 and 4 may be made of PET resin (for example, Rynite (a trade name)).

Second Embodiment

Referring to FIGS. 9 to 12, a roller-member mold for producing a roller member, a roller shaft, and a method of integral molding according to a second embodiment of the present invention will be described hereinbelow. FIG. 9, FIG. 10, FIG. 11, and FIG. 12 respectively correspond to FIG. 1, FIG. 4, FIG. 5, and FIG. 6 of the first embodiment. A molding apparatus (a roller-member producing apparatus) of this embodiment may also have the same configuration as that illustrated in FIGS. 7 and 8. In this embodiment, the appearance of the finally produced roller member 12 is the same as that of the first embodiment illustrated in FIG. 17. The same or corresponding components as the components of the first embodiment are given the same reference signs, and detailed descriptions thereof will be omitted.

FIG. 9 illustrates the cross-sectional structure of a roller member 12 produced in this embodiment. As illustrated, the roller member 12 has step-shaped recessed portions 13 and 13 in the outer surface of the flange portions 4 and 4. The recessed portions 13 and 13 are recessed in the thickness direction of the flange portions 4 and 4. The step-shaped recessed portions 13 and 13 are formed not by injection-molding of the roller shaft 1 but by contact-pressure of the mold. For example, the step-shaped recessed portions 13 and 13 are formed using contact-pressure of the second and third mold surfaces (the second molding member 8 and the third molding member 9) that respectively define the first and second flat portions 3 and 3 of the roller portion 2 during mold closing (clamping), as illustrated in FIGS. 10 to 12.

The step-shaped recessed portions 13 and 13 remain as impressions of the second molding member 8 and the third molding member 9 at the bases of the flat portions 3 and 3 of the roller portion 2.

FIG. 10 is a cross-sectional view of a mold for molding the roller member 12 of this embodiment. FIG. 10 illustrates the mold opened and the roller shaft 1 placed in the mold. As apparent from comparison between FIG. 10 and FIG. 4, the overall configuration and arrangement of the mold is the same as those of the mold in FIG. 4. The structure of the roller shaft 1 is also the same as that of the first embodiment, and the shapes of the flange portions 4 and 4 are substantially the same as those of FIG. 4.

With the configuration of FIG. 4, the portions of the second molding member 8 and the third molding member 9 corresponding to the first and second flat portions 3 and 3 of the roller portion 2 have dimensions and shapes that allow the portions to come into contact with the tops of the flange portions 4 and 4 when the mold is closed (FIG. 5).

In contrast, with the configuration in FIG. 10, the second and third mold surfaces of the second molding member 8 and the third molding member 9, which define the first and second flat portions 3 and 3 of the roller portion 2, protrude into the cavity more greatly than those of the configuration in FIG. 4. Closing (clamping) the second molding member 8 and the third molding member 9 with this configuration into contact with the flange portions 4 and 4 forms the step-shaped recessed portions 13 and 13 in the flange portions 4 and 4. In other words, part of the flange portions 4 and 4 is deformed along the rectangular shape of mold surface portions 13a and 13a of the second molding member 8 and the third molding member 9, which are brought into pressure-contact with the tops of the flange portions 4 and 4, to form the step-shaped recessed portions 13 and 13.

FIG. 11 illustrates a state in which the mold in FIG. 10 is closed, in which a molding material has not yet injected. When the mold with the above shape is closed, the mold surface portions 13a and 13a of the second molding member 8 and the third molding member 9 (FIG. 10) are brought into pressure-contact with the bite portions 5 and 5 of the flange portions 4 and 4 of the roller shaft 1 so as to elastically (or plastically) deform the bite portions 5 and 5. This causes the step-shaped recessed portions 13 and 13 to be formed at the upper outside of the flange portions 4 and 4. The shapes of the recessed portions 13 and 13 are defined by the shapes of the second molding member 8 and the third molding member 9. The amounts of deformation of the recessed portions 13 and 13 can be controlled also by the contact force of the moving stage 101 (FIGS. 7 and 8) of the molding apparatus 100.

FIG. 12 corresponds to FIG. 6 of the first embodiment, illustrating a state in which a molding material is injected. At this stage, the second molding member 8 and the third molding member 9 are in pressure-contact with the roller shaft 1 with the mold closed (clamped) so that the flange portions 4 and 4 are elastically (or plastically) deformed to form the recessed portions 13 and 13. This brings the second molding member 8 and the third molding member 9 into close-contact with the bite portions 5 and 5, thus completely sealing the clearance at the boundaries 11 and 11. Thus, even if a molding material is injected through the injection port 10 in this state, the injected molding material does not leak or generate burrs through the boundaries 11 and 11, providing the roller member 12 with quality equal to or higher than the quality of the first embodiment.

Third Embodiment

Referring to FIGS. 13 to 16, a roller-member mold for producing a roller member, a roller shaft, and a method of integral molding according to a third embodiment of the present invention will be described hereinbelow. In this embodiment, recessed portions 14 and 14 are formed in the flange portions 4 and 4 of the roller shaft 1 using the shapes and the contact pressure of the second molding member 8 and the third molding member 9, as in the second embodiment. Difference from the second embodiment is the shapes of the recessed portions 14 and 14 formed in the flange portions 4 and 4 of the roller shaft 1; the roller-member mold, the roller shaft, and the method of integral molding shown in FIGS. 13 to 16 are the same as those in FIGS. 9 to 12. The same or corresponding components as the components of the first and second embodiments are given the same reference signs, and detailed descriptions thereof will be omitted.

FIG. 13 illustrates the cross-sectional structure of a roller member 12 produced in this embodiment. As illustrated, the roller member 12 has tapered recessed portions 14 and 14 in the outer surface of the flange portions 4 and 4. The recessed portions 13 and 13 are recessed in the thickness direction of the flange portions 4 and 4. The tapered recessed portions 14 and 14 are formed not by injection-molding of the roller shaft 1 but by contact-pressure of the mold. As shown in FIGS. 14 to 16, the recessed portions 14 and 14 are formed using the same method as the method of the second embodiment. That is, the recessed portions 14 and 14 of the flange portions 4 and 4 of this embodiment are also formed using the shapes of the second molding member 8 and the third molding member 9 as in the second embodiment, or also with the contact pressure of the moving stage 101 of the molding apparatus 100. Difference from the second embodiment is only the shapes of the recessed portions 14 and 14 and the shapes of the second molding member 8 and the third molding member 9 corresponding thereto.

The tapered recessed portions 14 and 14 of this embodiment are formed using contact pressure of the second and third mold surfaces (the second molding member 8 and the third molding member 9) that respectively define the first and second flat portions 3 and 3 of the roller portion 2 during mold closing (clamping), as illustrated in FIGS. 14 to 16.

In this embodiment, however, the mold surface portions 14a and 14a of the second molding member 8 and the third molding member 9 corresponding to the lower surfaces of the first and second flat portions 3 and 3 of the roller portion 2 are tapered, as illustrated in FIG. 14.

Thus, as illustrated in FIG. 15, when the second and third molding members 8 and 9 are closed (clamped), the taped recessed portions 14 and 14 are formed on the upper outer surfaces of the flange portions 4 and 4 by the mold surface portions 14a and 14a of the second molding member 8 and the third molding member 9 (FIG. 14). In other words, when the second and third molding members 8 and 9 are closed (clamped), as illustrated in FIG. 15, the mold surface portions 14a and 14a of the second molding member 8 and the third molding member 9 (FIG. 14) are brought into pressure-contact with the bite portions 5 and 5 of the flange portions 4 and 4 of the roller shaft 1 to form the tapered recessed portions 14 and 14. The shapes of the recessed portions 14 and 14 are defined by the shapes of the second molding member 8 and the third molding member 9, or the amounts of deformation of the recessed portions 14 and 14 can be controlled also according to the contact pressure of the moving stage 101 (FIGS. 7 and 8) of the molding apparatus 100.

The tapered recessed portions 14 and 14 remain as impressions of the second molding member 8 and the third molding member 9 at the bases of the flat portions 3 and 3 of the roller portion 2.

FIG. 16 corresponds to FIG. 6 of the first embodiment and FIG. 12 of the second embodiment and illustrates a state in which a molding material is injected. At this stage, the second molding member 8 and the third molding member 9 are in pressure-contact with the roller shaft 1 with the mold closed (clamped) so that the flange portions 4 and 4 are elastically (or plastically) deformed to form the recessed portions 14 and 14. This brings the second molding member 8 and the third molding member 9 into close-contact with the bite portions 5 and 5, thus completely sealing the clearance at the boundaries 11 and 11. Thus, even if a molding material is injected through the injection port 10 in this state, the injected molding material does not leak or generate burrs through the boundaries 11 and 11, providing the roller member 12 with quality equal to or higher than the quality of the first embodiment.

In this embodiment, the mold surface portions 14a and 14a (FIG. 14), or the recessed portions 14 and 14, have a tapered shape without an angular portion, the flange portions 4 and 4 can be large in cross-sectional area. This can prevent the flange portions 4 and 4 from being cracked or broken during mold closing.

Specific examples of integral molding of the roller member 12 will be described hereinbelow with reference to specific dimensions.

Specific Example 1 of Integral Molding of Roller Member

A specific example in which the roller member 12 in FIGS. 1 to 3 described in the first embodiment is molded using the roller-member mold and the production method illustrated in FIGS. 4 to 8 will be described.

The shape of the roller member 12, the mold, and conditions for molding are as follows. For example, the roller shaft 1 of the roller member 12 is about 6 mm in diameter and 70 mm in length. The base (integrally molded portion) of the roller shaft 1 to which the roller portion 2 is to be integrally molded is about 10 mm in diameter. The roller portion 2 to be integrally molded is about 14 mm in outside diameter, 10 mm in inside diameter, 2 mm in thickness, and 10 mm in length. One roller portion 2 was integrally molded to one roller shaft 1. The flange portions 4 and 4 with a width of 0.4 mm and an outside diameter of 10.6 mm were formed at both sides of the base of the roller shaft 1, to which the roller portion 2 is integrally molded, at positions substantially corresponding to the flat portions 3 and 3 of the roller portion 2 (about 0.3 mm in height). The roller shaft 1 was produced by, for example, injection molding, using another mold separately from the above integral molding, as described above.

Here, not only the second molding member 8 and the third molding member 9 were brought into contact with the flange portions 4 and 4 of the roller shaft 1 but also a contact pressure that elastically (or plastically) deforms the flange portions 4 and 4 was applied using the moving stage 101 of the molding apparatus 100. For example, the amounts of pressure of the second molding member 8 and the third molding member 9 (the amounts of deformation of the flange portions 4 and 4) in the axial direction of the roller shaft 1 using the moving stage 101 of the molding apparatus 100 were set at about 0.02 mm for close contact.

The roller shaft 1 was molded in advance with, for example, PET resin (for example, Rynite (a trade name)) using another mold. An example of the material of the roller portion 2 is styrene elastomer resin (for example, Actymer (a trade name) with JIS hardness A60°.

The molding members have in outline the configurations shown in FIGS. 4 to 6 in which a one-point gate through the injection port 10 and a cold runner system were employed. Molding conditions for the molding apparatus 100 were a resin temperature of about 200° C., a mold cooling material temperature of about 30° C., and a pressure of 60 MPa. In this example, the molding cycle of the roller portion 2 was about 40 seconds.

The roller member 12 produced under the above conditions was satisfactory at a coaxial accuracy of 0.05 mm or less between the roller shaft 1 and the roller portion 2, an outside-diameter accuracy of the roller portion 2 of ±0.1 mm or less, and an axial position accuracy of the roller portion 2 of ±0.05 mm or less, which was molded stably without resin leakage and burrs.

Furthermore, when the roller member 12 produced under the above conditions was used under contact pressure as a roller member for conveying sheet materials or the like, the grip in the vicinity of the flat portions 3 and 3 at both ends of the roller portion 2 was strong. This may be because the repulsive force of the elastic material of the roller portion 2 is larger than the repulsive force of the other portions. This increased the frictional force from 1.5 to 2.0 as compared with a configuration without the flange portions 4 and 4, thus significantly improving the performance of conveying sheet materials or the like.

Specific Example 2 of Integral Molding of Roller Member

A specific example in which the roller member 12 in FIG. 9 described in the second embodiment is molded using the roller-member mold and the production method illustrated in FIGS. 10 to 12 will be described.

The shape of the roller member 12, the mold, and conditions for molding are the same as those of specific example 1 as follows. For example, the roller shaft 1 is about 6 mm in diameter and 70 mm in length. The base (integrally molded portion) of the roller shaft 1 to which the roller portion 2 is to be integrally molded is about 10 mm in diameter. The roller portion 2 to be integrally molded is about 14 mm in outside diameter, 10 mm in inside diameter, 2 mm in thickness, and 10 mm in length. One roller portion 2 was integrally molded to one roller shaft 1. The flange portions 4 and 4 with a width of 0.4 mm and an outside diameter of 10.6 mm were formed at both sides of the base of the roller shaft 1, to which the roller portion 2 is integrally molded, at positions substantially corresponding to the flat portions 3 and 3 of the roller portion 2 (about 0.3 mm in height). The roller shaft 1 was produced by, for example, injection molding, using another mold separately from the above integral molding, as described above.

With the configuration of the second embodiment, the second molding member 8 and the third molding member 9 are brought into pressure-contact more firmly than with the configuration of the first embodiment to elastically (or plastically) deform the flange portions 4 and 4 along the rectangular shapes of the mold surface portions 13*a* and 13*a*. For this purpose, the amounts of pressure of the second molding member 8 and the third molding member 9 along the axis of the roller shaft 1 were set larger than that in specific example 1. For example, the amounts of pressure of the second molding member 8 and the third molding member 9 (the amounts of deformation of the flange portions 4 and 4) in the axial direction of the roller shaft 1 using the moving stage 101 of the molding apparatus 100 were set at about 0.05 mm for close contact.

The materials of the components are the same as those of specific example 1. The roller shaft 1 was molded in advance with, for example, PET resin (for example, Rynite (a trade name)) using another mold. An example of the material of the roller portion 2 is styrene elastomer resin (for example, Actymer (a trade name) with JIS hardness A60°.

The molding members have in outline the configurations shown in FIGS. 10 to 12 in which a one-point gate through the injection port 10 and a cold runner system were employed. Molding conditions for the molding apparatus 100 were a resin temperature of about 200° C., a mold cooling material temperature of about 30° C., and a pressure of 60 MPa. In this example, the molding cycle of the roller portion 2 was about 40 seconds.

The roller member 12 produced under the above conditions was satisfactory at a coaxial accuracy of 0.05 mm or less between the roller shaft 1 and the roller portion 2, an outside-diameter accuracy of the roller portion 2 of ±0.1 mm or less, and an axial position accuracy of the roller portion 2 of ±0.05 mm or less, which was molded stably without resin leakage and burrs.

Furthermore, during the injection molding under the above conditions, the second molding member 8 and the third molding member 9 were brought into pressure contact to the flange portions 4 and 4 exposed to the bottoms of the flat portions 3 and 3 of the roller portion 2 so that the step-shaped recessed portions 13 and 13 of a depth of about 0.03 mm are formed in the flange portions 4 and 4. This allows resin leakage during molding to be completely and stably prevented.

Specific Example 3 of Integral Molding of Roller Member

A specific example in which the roller member 12 in FIG. 13 described in the third embodiment is molded using the roller-member mold and the production method illustrated in FIGS. 14 to 16 will be described.

The shape of the roller member 12, the mold, and conditions for molding are the same as those of specific examples 1 and 2 as follows. For example, the roller shaft 1 is about 6 mm in diameter and 70 mm in length. The base (integrally molded portion) of the roller shaft 1 to which the roller portion 2 is to be integrally molded is about 10 mm in diameter. The roller portion 2 to be integrally molded is about 14 mm in outside diameter, 10 mm in inside diameter, 2 mm in thickness, and 10 mm in length. One roller portion 2 was integrally molded to one roller shaft 1. The flange portions 4 and 4 with a width of 0.4 mm and an outside diameter of 10.6 mm were formed at both sides of the base of the roller shaft 1, to which the roller portion 2 is integrally molded, at positions substantially corresponding to the flat portions 3 and 3 of the roller portion 2 (about 0.3 mm in height). The roller shaft 1 was produced by, for example, injection molding, using another mold separately from the above integral molding, as described above.

With the configuration of the third embodiment, as in the second embodiment, the second molding member 8 and the third molding member 9 are firmly brought into pressure-contact to elastically (or plastically) deform the flange portions 4 and 4 along the tapered shapes of the mold surface portions 14a and 14a. For this purpose, the amounts of pressure of the second molding member 8 and the third molding member 9 along the axis of the roller shaft 1 were set larger than those in specific examples 1 and 2. For example, the amounts of pressure of the second molding member 8 and the third molding member 9 (the amounts of deformation of the flange portions 4 and 4) in the axial direction of the roller shaft 1 using the moving stage 101 of the molding apparatus 100 were set at about 0.1 mm for close contact.

The materials of the components are the same as those of specific examples 1 and 2. The roller shaft 1 was molded in advance with, for example, PET resin (for example, Rynite (a trade name)) using another mold. An example of the material of the roller portion 2 is styrene elastomer resin (for example, Actymer (a trade name) with JIS hardness A60°.

The molding members have in outline the configurations shown in FIGS. 14 to 16 in which a one-point gate through the injection port 10 and a cold runner system were employed. Molding conditions for the molding apparatus 100 were a resin temperature of about 200° C., a mold cooling material temperature of about 30° C., and a pressure of 60 MPa. In this example, the molding cycle of the roller portion 2 was about 40 seconds.

The roller member 12 produced under the above conditions was satisfactory at a coaxial accuracy of 0.05 mm or less between the roller shaft 1 and the roller portion 2, an outside-diameter accuracy of the roller portion 2 of ±0.1 mm or less, and an axial position accuracy of the roller portion 2 of ±0.05 mm or less, which was molded stably without resin leakage and burrs.

Furthermore, the roller member 12 produced under the above conditions was formed by bringing the second molding member 8 and the third molding member 9 tightly into close-contact with the roller shaft 1, so that the tapered recessed portions 14 and 14 had a depth of about 0.1 mm at the deepest portions. Such mold clamping during injection molding prevents resin leakage during molding more completely and stably. With the configuration of the third embodiment, the recessed portions 14 and 14 formed in the flange portions 4 and 4 (or the mold surface portions 14a and 14a) are tapered. This prevents the flange portions 4 and 4 from being cracked or broken, thus greatly improving the throughput.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-238457, filed Nov. 26, 2014, which is hereby incorporated by reference herein in its entirety.

The invention claimed is:

1. A method for producing a roller member by inserting a roller shaft into a mold having a first mold surface that defines an outer circumference of a roller portion, a second mold surface that defines a first flat portion of the roller portion, and a third mold surface that defines a second flat portion of the roller portion, by closing the mold, and by injecting a molding material around the roller shaft to integrally mold the roller portion to the roller shaft, the method comprising the steps of:

inserting the roller shaft that has a cut portion including first and second flange portions at portions respectively corresponding to the first and second flat portions into the mold and closing the mold in such a way that the second and third mold surfaces are respectively brought into contact with the first and second flange portions and respectively deform the first and second flange portions; and injecting the molding material for the roller portion into a cavity defined by the first, second, and third mold surfaces of the mold and the roller shaft.

2. The method for producing a roller member according to claim 1, wherein the first and second flange portions are partly deformed by 0.01 mm or more and 3 mm or less.

3. The method for producing a roller member according to claim 2, wherein mold surface portions of the second mold surface and the third mold surface that respectively deform part of the first and second flange portions have a step shape.

4. The method for producing a roller member according to claim 2, wherein mold surface portions of the second mold surface and the third mold surface that respectively deform part of the first and second flange portions have a tapered shape.

5. A copier having the roller member produced by the producing method according to claim 1 as a member for conveying a sheet.

6. A printer having the roller member produced by the producing method according to claim 1 as a member for conveying a sheet.

* * * * *